(12) United States Patent
Li

(10) Patent No.: US 8,914,366 B1
(45) Date of Patent: Dec. 16, 2014

(54) EVALUATING CLUSTERING BASED ON METRICS

(75) Inventor: Xin Li, North Bergen, NJ (US)

(73) Assignee: Google Inc., Mountain View, CA (US)

( * ) Notice: Subject to any disclaimer, the term of this patent is extended or adjusted under 35 U.S.C. 154(b) by 1848 days.

(21) Appl. No.: 11/771,815

(22) Filed: Jun. 29, 2007

(51) Int. Cl.
*G06F 17/30* (2006.01)
*G06F 7/00* (2006.01)

(52) U.S. Cl.
CPC ...... *G06F 17/3071* (2013.01); *G06F 17/30598* (2013.01); *G06F 17/30705* (2013.01)
USPC ............................ 707/737; 707/748; 707/739

(58) Field of Classification Search
CPC .................. G06F 17/30687; G06F 17/30699; G06F 17/30707; G06F 17/3071; G06F 17/30598; G06F 17/30705
See application file for complete search history.

(56) References Cited

PUBLICATIONS

A tandem clustering process for multimodal datasets Cho, Catherine; Kim, Sooyoung; Lee, Jaewook; Lee, Dae-Won European Journal of Operational Research, vol. 168, Issue 3, Feb. 1, 2006, pp. 998-1008.*

* cited by examiner

*Primary Examiner* — Ann Lo
(74) *Attorney, Agent, or Firm* — Fish & Richardson P.C.

(57) ABSTRACT

Clusters generated by a first clustering process are received, each cluster including one or more related records. A second clustering process is applied to the received clusters. Received clusters generated by the first clustering process are compared with results of the second clustering process. Information is output based on the comparison for evaluating the first clustering process. A tendency of the first clustering process to duplicate a record associated with a single entity in multiple clusters can be determined. A tendency of the first clustering process to cluster records associated with different entities in a single cluster can be determined.

27 Claims, 10 Drawing Sheets

EVALUATING CLUSTERING BASED ON METRICS

FIELD

This disclosure relates to evaluating clustering processes.

BACKGROUND

Clustering involves organizing objects into different groups based on characteristics of the objects. Clustering processes can be used in a variety of applications. One application for clustering includes building a search index, which could be used to provide search results that relate to a user's geographic location (e.g., a list of businesses in a user's zip code). The clustering process may identify records describing a particular entity and merge those records together as a cluster representing that entity. The clusters can then be used to generate listings in the search index, where each listing represents a cluster of different records associated with the same entity.

SUMMARY

In one general aspect, a computer-implemented method may involve receiving clusters generated by a first clustering process, each cluster including one or more related records. The method may involve applying a second clustering process to the received clusters and comparing received clusters generated by the first clustering process with results of the second clustering process. The method may involve outputting information based on the comparison for evaluating the first clustering process.

Implementations may include one or more of the following features. For example, applying a second clustering process may involve applying a second process other than the first process.

The comparing may involve determining a duplication tendency. The duplication tendency may reflect a tendency of the first clustering process to duplicate a record associated with a single entity in multiple clusters. Determining a duplication tendency may involve expressing the duplication tendency using a duplication metric. The duplication tendency may be quantified as a percentage.

Determining a duplication tendency may involve selecting a representative record from each of the received clusters generated by the first clustering process. Determining a duplication tendency may also involve applying the second clustering process to the selected representative records; comparing a number of clusters generated by the second clustering process to a number of clusters generated by the first clustering process; and determining the duplication tendency based on results of the comparing. Selecting representative records may involve selecting the representative records based on confidence factors.

In some implementations, comparing received clusters generated by the first clustering process with results of the second clustering process may involve determining an overclustering tendency. The overclustering tendency may reflect a tendency of the first clustering process to cluster records associated with different entities in a single cluster. Determining an overclustering tendency may involve expressing the overclustering tendency using a metric. Determining an overclustering tendency may involve quantifying the overclustering tendency as a percentage.

Determining an overclustering tendency may involve applying the second clustering process to each received cluster generated by the first clustering process. It may also involve determining whether any of the received clusters split into multiple clusters when the second clustering process is applied.

Receiving clusters generated by a first clustering process may involve receiving a number of collections of related business records from different sources. Outputting information based on the comparison for evaluating the first clustering process may involve outputting information for evaluating at least one aspect of performance associated with the first clustering process.

Evaluating the first clustering process may be automated. Evaluating the first clustering process may include selecting sample data based on the comparison; providing the selected sample data to a user; and receiving evaluation data from the user based on the sample data.

In some implementations, a local search index may be built using the received clusters generated by the first clustering process.

In another general aspect, a computer-implemented method may involve receiving clusters generated by a first clustering process, each cluster including one or more related records. The method may involve applying a second clustering process to the received clusters and comparing received clusters generated by the first clustering process with results of the second clustering process. The method may output information associated with the comparison for evaluating the first clustering process. The evaluated first clustering process may be used to target advertisements to user systems.

In another general aspect, a system may comprise: means for receiving clusters generated by a first clustering process, each cluster including one or more related records; means for applying a second clustering process to the received clusters; means for comparing received clusters generated by the first clustering process with results of the second clustering process; and means for outputting information associated with the comparison for evaluating the first clustering process.

Implementations may include one or more of the following features. For example, the means for comparing may include means for determining a duplication metric. The duplication metric may reflect a tendency of the first clustering process to duplicate a record associated with a single entity in multiple clusters.

The means for determining a duplication metric may include: means for selecting a representative record from each of the received clusters generated by the first clustering process; means for applying the second clustering process to the selected representative records; means for comparing a number of clusters generated by the second clustering process to a number of clusters generated by the first clustering process; and means for determining the duplication metric based on results of the comparing.

The means for comparing may include means for determining an overclustering metric. The overclustering metric may reflect a tendency of the first clustering process to cluster records associated with different entities in a single cluster. The means for determining an overclustering metric may include means for applying the second clustering process to each received cluster generated by the first clustering process and means for determining whether any of the received clusters split into multiple clusters when the second clustering process is applied.

In another general aspect, a computer-implemented method for evaluating a clustering process may involve receiving clusters generated by a first clustering process, each cluster including one or more related records. The method may select a representative record from each of the clusters and apply a second clustering process, other than the first clustering process, to the selected representative records. The method may compare a number of clusters generated by the second clustering process to a number of clusters generated by the first clustering process. The method may involve determining a tendency of the first clustering process to duplicate a record in multiple clusters based on results of the comparing. The method may also involve outputting information associated with the determined tendency for evaluating at least one aspect of performance associated with the first clustering process.

In another general aspect, a computer-implemented method for evaluating a clustering process may involve receiving clusters generated by a first clustering process, each cluster including one or more related records. The method may involve applying a second clustering process, other than the first clustering process, to each of the received clusters and determining whether any of the received clusters split into multiple clusters when the second clustering process is applied. The method may involve determining a tendency of the first clustering process to cluster different records in a single cluster based on whether any of the received clusters split when the second clustering process is applied. The method may involve outputting information associated with the determined tendency for evaluating at least one aspect of performance associated with the first clustering process.

In another general aspect, a computer-implemented method may involve receiving first clusters generated by a first clustering process, each cluster including one or more related records. A modification may be applied to the first clustering process. The method may receive second clusters generated by the modified first clustering process. The method may apply a second clustering process to the received second clusters to generate third clusters. The method may determine evaluation metrics based on a comparison of the second and third clusters and evaluate the applied modification based on the determined metrics.

Implementations may include one or more of the following features. For example, the evaluating may involve identifying sample clusters from the second and third clusters based on the evaluation metrics; receiving scores associated with the applied modification, the scores based on the identified sample clusters; and evaluating the received scores.

Determining evaluation metrics may involve determining a duplication metric. The duplication metric may reflect a tendency of the modified first clustering process to duplicate a record in clusters.

Determining a duplication metric may involve selecting a representative record from each of the second clusters and applying the second clustering process to the selected representative records. Determining a duplication metric may also involve comparing a number of clusters generated by the second clustering process to a number of clusters generated by the modified first clustering process and determining the duplication metric based on results of the comparing.

Determining evaluation metrics may involve determining an overclustering metric. The overclustering metric may reflect a tendency of the modified first clustering process to cluster different records in a single cluster. Determining an overclustering metric may involve applying the second clustering process to each of the second clusters and determining whether any of the second clusters split into multiple clusters in the third clusters.

In another general aspect, a computer readable medium stores a computer program. The computer program includes instructions that, when executed, cause at least one processor to: receive clusters generated by a first clustering process, each cluster including one or more related records; apply a second clustering process to the received clusters; compare received clusters generated by the first clustering process with results of the second clustering process; and output information based on the comparison for evaluating the first clustering process.

Implementations may include one or more of the following features. For example, the computer program may include instructions for determining a duplication tendency, the duplication tendency reflecting a tendency of the first clustering process to duplicate a record associated with a single entity in multiple clusters. The computer program may also include instructions for determining an overclustering tendency, the overclustering tendency reflecting a tendency of the first clustering process to cluster records associated with different entities in a single cluster.

The details of one or more implementations are set forth in the accompanying drawings and the description below. Other features and advantages will be apparent from the description and drawings as well as from the claims.

BRIEF DESCRIPTION OF THE DRAWINGS

The accompanying drawings show features of implementations consistent with this disclosure and, together with the corresponding description, help explain principles associated with the disclosure.

DESCRIPTION

The following description refers to the accompanying drawings, in which, in the absence of a contrary representation, the same numbers in different drawings represent similar elements.

Example Clustering Environment

Figure 1:
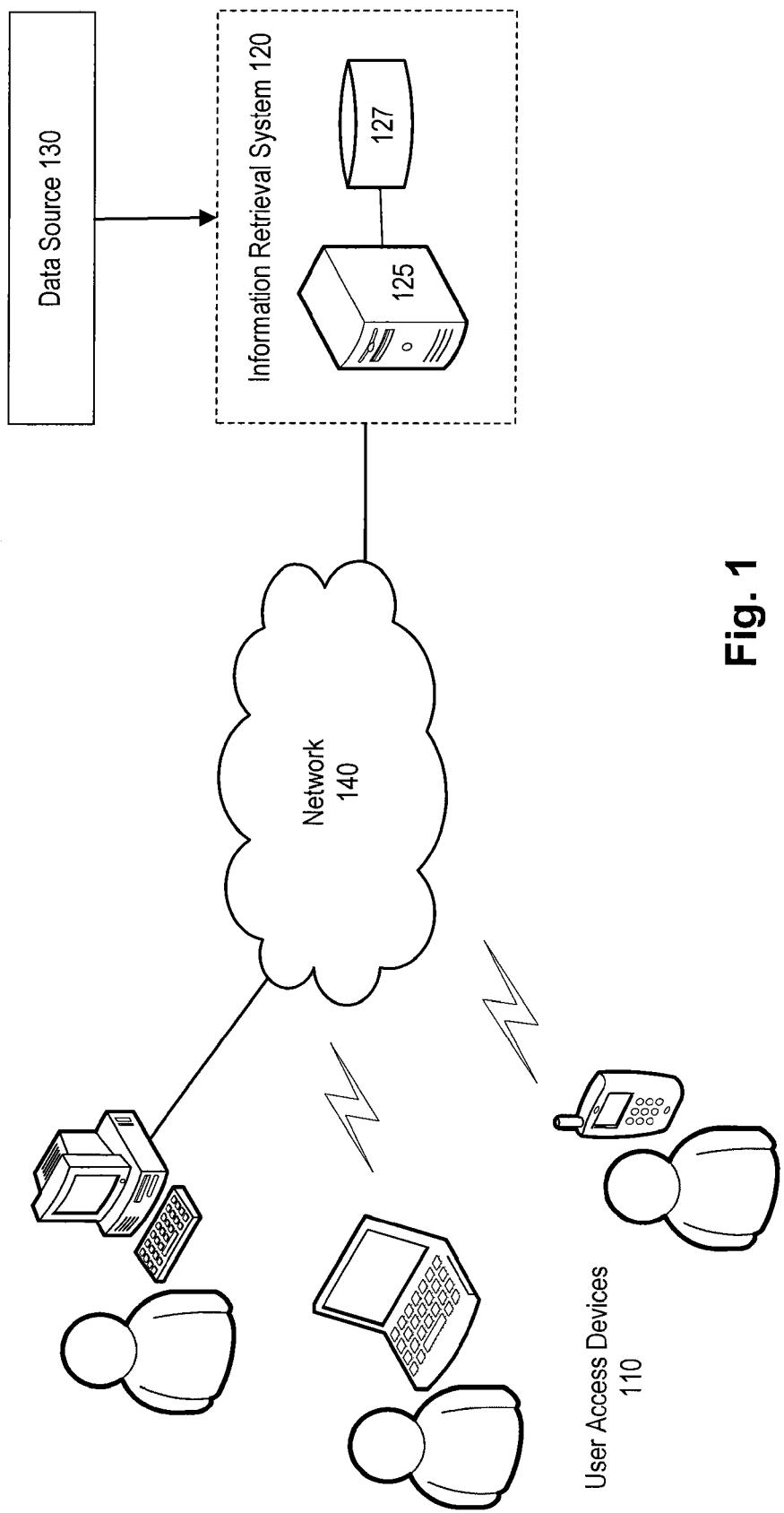
FIG. 1 is a block diagram depicting an example operating environment.

FIG. 1 is a block diagram illustrating an example clustering environment 100. The environment 100 may include one or more user access devices 110 and one or more information retrieval systems 120, which may be coupled to a network 140. The elements 110 and 120 may be implemented or associated with hardware components, software components, or firmware components or any combination of such components. The elements 110 and 120 could, for example, be implemented or associated with general purpose servers, software processes and engines, and/or various embedded systems.

The user access devices 110 may include any devices capable of receiving information from the network 140. The user access devices 110 could include general computing components and/or embedded systems optimized with specific components for performing specific tasks. Examples of user systems include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems and the like. The user access devices 110 could also include various other elements, such as processes running on various machines.

In some implementations, the user access devices 110 may send requests (e.g., Internet or other search requests) and various information to the network for receipt by the information retrieval system 120. The user access devices 110 may also receive information from the information retrieval system 120 (e.g., search results) via the network and present the information (e.g., via a browser or other viewer) to users.

The information retrieval system 120 may provide various services to the user access devices 110. The information retrieval system 120 may include or maintain one or more data processing systems 125, such as servers or embedded systems, coupled to the network 140. The information retrieval system 120 could include or maintain one or more processes that run on one or more data processing systems. In some examples, the information retrieval system 120 may also include one or more repositories 127 for storing various information.

In some implementations, the information retrieval system 120 may provide mapping and/or other location-based services to the user access devices 110. For example, the information retrieval system 120 may generate and/or provide interactive maps (e.g., street maps), driving directions, route planning, aerial/satellite imagery, etc. to the user access devices 110 in response to certain requests. The information retrieval system 120 may allow users to input an address, intersection or other location information via the user access devices 110. In response, the information retrieval system 120 may provide an identification of the requested location on a map, which may be displayed by the user access devices 110.

Additionally, or alternatively, the information retrieval system 120 could provide searching services and provide content to the user access devices 110 in the form of search results. A search service can receive queries for search results and retrieve relevant search results from various sources, such as a search index (e.g., an index of web pages). Search results can include, for example, lists of web page titles, snippets of text extracted from those web pages, and hypertext links to those web pages.

In some examples, the information retrieval system 120 may provide "local search" services to the user access devices 110. A "local search" service may provide users with information (such as business listings) related to their particular geographic locations. An example of such a local search service is the Google Local service offered by Google, Inc. (Mountain View, Calif.). Such local search services can be particularly helpful to users of mobile devices, since mobile users are often seeking information about local businesses while they are in transit.

The local search service may receive a search request, identify location information associated with request, and search for information in that location. The location information could be input directly by a user with a search query (e.g., "pizza shops near LAX"). The location information could also be determined based on a particular area shown on a map viewed by the user when the search is performed, or may be based on a center point on the map. In other examples, location information may be assigned for a user to be applied across all searches. In addition, the local information for a user could be determined and/or received by a device, such as a GPS device, included in or coupled to the user access devices 110 and/or the information retrieval system 120.

With a local search service, a user may input a selection to conduct a local search (e.g., a location-specific search). In response, the user's device 110 may display a search box, which may be displayed over a map if the user was previously using a mapping function. The user may then provide a query, which may be encoded and provided to the information retrieval system 120. As an example, a user may enter "pizza near LAX" and the user's device 110 may submit the query to the local search function of the information retrieval system 120. In another example, a user may enter "pizza" and the user's device 110 may append a default location (such as the user's home zip code, or the coordinates for the center of the currently displayed map) and submit the combined query to the information retrieval system 120. The information retrieval system 120 may generate search results (e.g., information about pizza shops) along with location information (e.g., coordinates) associated with each result, and may transmit the results to the user's device. The system 120 or some other accessible mapping server may generate and display static and/or dynamic maps, which may include images and markers for indicating locations associated with search results.

To provide the various searching services, the information retrieval system 120 may include one or more content crawlers that browse accessible resources (e.g., the World Wide Web), for example, in an automated fashion. The content crawlers may create copies of the browsed content for subsequent processing by other elements, such as a search engine. The crawlers could also check links, validate code, harvest information, and/or perform other maintenance or other tasks.

Additionally, or alternatively, the information retrieval system 120 may access one or more data feeds associated with one or more data sources 130. The data sources 130 may include any resource that compiles and provides information to the information retrieval system 120. Examples of the data sources 130 include database compiling services that provide detailed information on businesses in various regions.

Data feeds from the data sources 130 may provide various information for use in searching services provided by information retrieval system 120. In one example, the information retrieval system 120 may access one or more directory data feeds from the data sources 130 that provide various directory or "yellow page" information (e.g., name, address, telephone numbers, etc.) associated with businesses.

The information retrieval system 120 may include one or more search engines. The search engines could search information from various resources, such as the World Wide Web, intranets, newsgroups, databases, and/or directories. The search engines may employ one or more known search or other processes to search data. In some implementations, the search engines may index crawled content and/or content received from data feeds to build one or more search indices. The search indices may be used to facilitate rapid retrieval of information relevant to a search query. The information retrieval system 120 may query search indexes in response to user requests in order to locate relevant information. Querying the search indices may be significantly faster than performing a raw scan of potentially relevant data.

The information retrieval system 120 may include various types of search indices, which may include various data structures. Search indices could include, for example, tree structures (e.g., binary trees, suffix trees), arrays (e.g., associate arrays, suffix arrays), tables (e.g., has tables) and/or matrices. The indices may be used to maximize efficiency of information retrieval by various searching services. In one example, the information retrieval system 120 may include one or more local search indexes, which may facilitate local searching services (i.e., location-specific searching services).

In some implementations, the information retrieval system 120 may provide targeted advertisements to the user access devices 110 or facilitate or assist in the providing of targeted advertisement to the devices 110 by other dedicated advertisement systems. An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of public notice, such as a public notice published in printed or electronic press or a broadcast. An ad may be referred to or include sponsored-content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

To provide and/or facilitate services, such as local search services, the information retrieval system 120 may employ one or more clustering processes. The term "clustering" refers, for example, to the partitioning or organizing of information (e.g., business listings, ads, etc.) into one or more subsets or "clusters" of information. The information elements included in each cluster may be related in that they share a common characteristic, such as proximity to a defined mathematical distance measure (e.g., a Euclidean distance). The information retrieval system 120 may perform clustering on crawled information and/or information received from data feeds or other sources. Additional details of an example clustering process are discussed below in connection with FIG. 2.

The information retrieval system 120 may include one or more known hierarchical or non-hierarchical clustering algorithms, such as K-means, agglomerative clustering, QT Clust, fuzzy c-means clustering, the Shi-Malik algorithm, the Meila-Shi algorithm, group average clustering, single linkage clustering, complete linkage clustering, the Ward algorithm, centroid clustering, and weighted group average clustering.

In some implementations, the information retrieval system 120 may perform clustering to identify information describing particular entities, such as businesses, and merge this information together as a cluster representing that entity. That is, each cluster may include information that describes a particular entity. For example, a first cluster may represent a first business and may include information from different sources describing that first business. A second cluster may represent a second, different business and may include information describing that second business.

The information retrieval system 120 may also perform clustering to identify and group ads or other information. In some examples, the information retrieval system 120 could merge related ads as a cluster. For example, a given cluster may contain one or more ads related to a particular entity or location.

The information retrieval system 120 may also perform clustering to merge information (e.g., business listings, ads, etc.) together in a cluster representing some subject, topic or context. For example, instead of each resultant cluster representing a single business or other entity, each resultant cluster may represent one or more entities that share a common context or subject.

The information retrieval system 120 may use clustered data to generate listings in search indices. For example, the information retrieval system 120 may cluster information describing business entities and build a local search index that includes a listing of entities represented by the clusters. The local search index may facilitate local search services provided by the system 120.

The network 140 may include any element or system that facilitates communications among and between various network nodes, such as the elements 110, 120 and 130. The network 140 may include one or more telecommunications networks, such as computer networks, telephone or other communications networks, the Internet, etc. The network 140 may include a shared, public, or private data network encompassing a wide area (e.g., WAN) or local area (e.g., LAN). In some implementations, the network 140 may facilitate data exchange by way of packet switching using the Internet Protocol (IP). The network 140 may facilitate wired and/or wireless connectivity and communication.

For purposes of explanation only, FIG. 1 depicts certain discrete elements. The number, identity and arrangement of elements in the environment 100 are not limited to what is shown. For example, the environment 100 could include any number of geographically-dispersed user access devices 110, data sources 130 and/or information retrieval systems 120, which may be discrete, integrated modules or distributed systems. In addition, in some examples, the data sources 130 may be part of the information retrieval system 120 rather than a separate entity.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2:
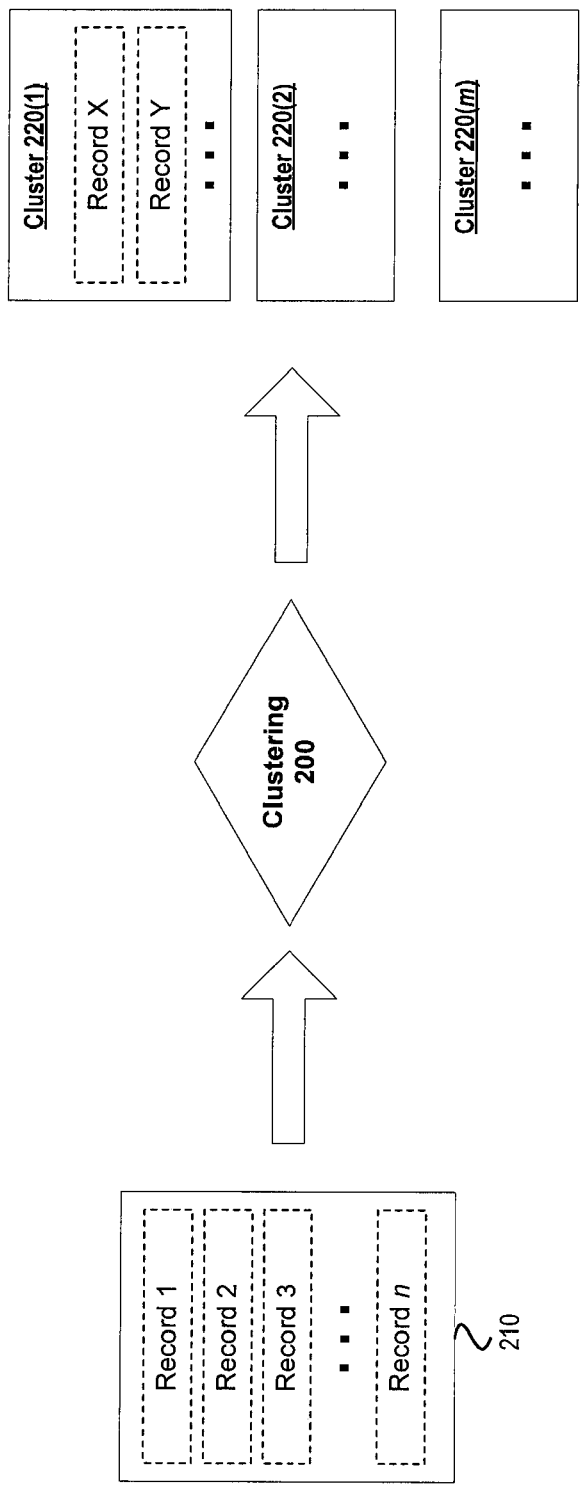
FIG. 2 is a block diagram showing an example clustering.

FIG. 2 graphically depicts a clustering process 200 that could be performed by information retrieval system 120. In some implementations, the clustering process 200 may be used to build a local search or other index. The clustering process 200 could also be used for other purposes, such as for targeting advertisements. As illustrated in FIG. 2, the clustering process 200 may involve organizing an input set 210 of n records into one or more resultant clusters, such as the clusters 220(1)-220(m), where each resultant cluster includes one or more of the records in the input set. The records included in each cluster may be related in that they share a common characteristic.

A "record" refers, for example, to a collection or unit of related information elements. Records may be associated with objects or entities, such as business enterprises. For example, one or more records may describe a particular restaurant or other business. In some implementations, a "record" may include or be associated with one or more advertisements or other information elements. The input set 210 may include records from various and different sources, and the clustering process 200 may organize these records into the resultant clusters.

A "record" is not limited to any particular storage or transmission format. While a record may be implemented as one or more rows in a database table or as a record in a software application, a record is not limited to those formats. Records may be stored and/or communicated via various mediums and in various forms. In some examples, records may be communicated through an interactive medium, such as the Internet, and may include graphics, text, images, audio, video, etc. Records could also include embedded information, such as embedded media, links, meta-information, and/or machine executable instructions. Records could be communicated through data feeds (e.g., RSS feeds), radio channels, television channels, print media, and/or other media.

The input set 210 may include records identified by content crawlers. The input set 210 could also include records received from one or more data feeds, such as feeds that supply directory type information (e.g., yellow page information) associated with businesses. The records in the input set 210 may originate from a single data feed or from various data feeds. The input set 210 could include records from various other sources, such as advertisement or other systems.

The clustering process 200 may identify one or more records, from different sources, describing particular entities (e.g., businesses) and merge these records together as a cluster representing that entity. That is, each cluster (e.g., 220(1)-220(m)) may include a set of records that describe a particular entity. For example, the cluster 220(1) may represent a particular pizza shop and may include a set of records from different sources describing that particular pizza shop. The cluster 220(2) may represent a different pizza shop and may include a set of records describing that pizza shop.

In some examples, the clustering process 200 may organize input data into clusters such that each resultant cluster represents more than one entity (e.g., more than one business entity). That is, instead of each resultant cluster representing a single business or other entity, each resultant cluster may represent one or more entities that share a common characteristic. In some examples, the clustering process 200 may generate resultant clusters that represent single business or other entities as well as one or more superclusters of those resultant clusters. Each supercluster may represent one or more of the resultant clusters representing single entities. As an example, the clustering process 200 may generate a first cluster representing a first business and a second cluster representing a second, different business. A supercluster may be a cluster that represents the first and second business entities.

In some examples, the clustering process 200 may organize input data into clusters such that each resultant cluster includes one or more advertisements or other information elements related to one or more business or other entities. For instance, the clustering process 200 may organize a set of ads related to a given restaurant in a resultant cluster.

In some examples, the clustering process 200 may organize data into resultant clusters based on subject or context. For example, the clustering process 200 may group one or more records associated with pizza shops in a "food" cluster, a "pizza" cluster, and/or a "restaurant" cluster.

In some implementations, the records in the input set 210 may be arranged in a particular format and may include particular parameters and data elements. For example, a particular data feed may provide records to the information retrieval system 120 in a specific format with specific data elements. Each record in the input set 210 could include a business identifier, a business name, a postal address, a geographic position (e.g., longitude and latitude), and a telephone number. Each record could also include a confidence indication, which describes the quality or reliability of the data source. The confidence indication may represent, for example, a likelihood that data associated with a particular data source is accurate relative to some standard or other data source.

In some examples, one or more records in the input set 210 could be arranged as follows:

Record (input)={ID
   Name
   Postal Address
   Position
   Tel
   Confidence
}

The above format and data elements are merely examples and are not intended to be limiting. Records may include various other data elements and formats depending on the implementation.

In some implementations, some or all of the data elements in a record could be provided and arranged by the record source (e.g., data feeds from the data sources 130). For example, the information retrieval system 120 could receive business records populated with data in the above-mentioned format. In some implementations, the records could be processed and formatted after being received from the sources but prior to clustering process 200. For example, the information retrieval system 120 could perform some pre-processing on received data prior to executing the clustering process 200. Some or all of the data elements in the records could be added during this pre-processing. As an example, the confidence indication could be added by the information retrieval system 120. The confidence indication may be determined and added based on a source of the record. For example, the yellow pages may have a higher confidence than a web source.

Similar to the input records, each record in the resultant clusters may be arranged in a specific format. For example, the clustered records may include a business identifier, a business name, a postal address, geographic position (e.g., longitude and latitude), a telephone number, and a confidence identifier. In addition, each record in the resultant clusters may include a cluster identifier, an authority indication, and an affinity indication. In one example, the clustered records could be arranged as follows:

Record (output)={ID
   Name
   Postal Address
   Position
   Tel
   Confidence
   Cluster ID
   Authority
   Affinity
}

The cluster ID, authority and affinity may be assigned to the records during the clustering process 200. The cluster ID may identify the particular cluster in which the record resides. Authority may describe the position of the record within the cluster—the higher the authority, the more representative of the cluster. Affinity may indicate how well the record binds to the cluster. These data elements in the clustered records are merely examples and are not intended to be limiting. Clustered records may include various other data elements and formats depending on the implementation.

In some implementations, the clustering process 200 may organize the input set 210 into one or more clusters, for example, based on similarity in name, telephone number, and address. The clustering process 200 may determine this similarity and generate the clusters using a scoring technique. In one implementation, the scoring technique could be expressed as follows:

TotalScore=NameScore+PhoneScore+AddressScore in which:
NameScore=TermScore−TermPenalty
PhoneScore=CONST*Number of Matches
AddressScore=−DistancePenalty With this technique, the clustering 200 may compute a TotalScore for the records in the input set 210. If the TotalScore is greater than some predefined clustering threshold $T_C$, the scored records will be merged into the same cluster. In one implementation, the clustering 200 may process the input set 210 by successively computing a TotalScore for pairs of business records in the input set 210.

The clustering threshold $T_C$ may be set as a numeric value, such as the value 15.0. Other values may also be used, depending on the implementation. The threshold value may be determined or selected based on one or more user or system observations.

When computing the TotalScore, the clustering process 200 may determine a NameScore based on a determined TermScore and a determined TermPenalty. The TermScore and TermPenalty values may be determined based on a term distribution. A "term" may include, for example, words and bigrams. As an example, the term {The Pet Market} includes the words {The}, {Pet} and {Market} and the bigrams {∥-The}, {The Pet}, {Pet Market}, and {Market-∥}. The {∥-} represents a start mark, and the {-∥} represents an end mark. The term "distribution" represents the frequency of terms collected within a given range. This range may be a geographic or other range. For example, the term distribution may represent the frequency of terms collected within 1.5 miles of a given airport or other location.

The TermScore may be computed as: TermScore=−log (frequency). The TermPenalty may be computed by applying some penalty factor to the computed TermScore. The NameScore may then be computed as:

NameScore=TermScore−TermPenalty

NameScore=TermScore(MatchedTerms)−αTermScore (NonMatchedTerms)

In the above equation, α is a penalty factor. In one example, the value of this penalty factor could be 0.1. Other penalty factor values may also be used.

As an example of computing the NameScore, consider a record containing the name "Big Apple Restaurant" and another record containing the name "Big Apple Hotel" in a given geographic area. To account for multiple instance of the term {Big Apple} in the area, the clustering process 200 may use a penalty factor. In particular, the clustering process 200 may determine a term distribution for the term {Big Apple} by determining the frequency of the word {Big} and/or {Apple} within the area. For example, the clustering process may determine the number of instances of {Big Apple} in an area surrounding Times Square. If there are, for example, 100 instances of the term {Big Apple} in the area, the frequency may be determined as frequency=1/100. In this case, the TermScore may be determined as TermScore=−log(frequency)=− log(1/100)=2. The TermPenalty may then be computed as TermPenalty=α*TermScore=α*(2). Assuming a penalty factor of 0.1, the TermPenalty may be (0.1)(2)=0.2. The NameScore may be computed as NameScore=TermScore− TermPenalty=2−0.2=1.8.

In computing the TotalScore, the clustering process 200 may also determine a PhoneScore. In some examples, each business record may include one or more phone numbers associated with a business. The PhoneScore may reflect the number of matching numbers between the business records being scored. The PhoneScore can be computed by multiplying some constant value (CONST) by the number of phone number matches between business records. For example, if there are two phone numbers in each business record and both numbers match in the records, the PhoneScore could be determined as: PhoneScore=CONST*2. If none of the number match, the PhoneScore may be determined to be zero. In one example, the constant value (CONST) may be set with a value of 10.0. Other values may also be used. In some implementations, the constant (CONST) may be set based on the threshold $T_C$ to reflect an importance of the PhoneScore relative to other scores (i.e., to appropriately weight the PhoneScore). For example, the constant (CONST) may be set with a relatively high value (e.g., 10.0 or 12.0) with respect to the threshold $T_C$ (e.g., 15.0), in order to reflect a high level of importance of the PhoneScore relative to other scores.

The clustering process 200 may also determine a DistancePenalty, which may be used to account for a given density of businesses in a given area when determining whether to merge records. The DistancePenalty value may be computed using a local density. The local density may represent a number of businesses in a given area, such as one square mile. The DistancePenalty may be computed, for example, as (distance)/(density). The DistancePenalty may be used to compute the AddressScore, as noted above (i.e., AddressScore=− DistancePenalty).

As explained above, if the TotalScore is greater than a predefined threshold $T_C$, the scored records will be merged into the same cluster. In merging records, the clustering process 200 may apply various rules. For example, a first rule may specify that, if the phone numbers do not match, merging should not occur unless the name and address match exactly. A second rule may specify that records should not merge if the name score is below a predetermined threshold. A third rule may specify that merging should not occur if both the address and phone number do not match. Various other rules may be used, in addition to or instead of the examples noted above.

The scoring technique discussed above is merely an example. Other scoring techniques could additionally or alternatively be used with the clustering process 200. Also, in some examples, the clustering process 200 may use one or more techniques that do not involve scoring. Furthermore, even with the above scoring technique, the particular scores, thresholds and/or calculations may vary from the examples noted above. The above scoring technique may include less than all of the scores, thresholds and/or calculations noted above or additional or other scores, thresholds and/or calculations. For example, if certain information (e.g., phone numbers) are not included in the input data, then the scoring technique may not determine scores associated with that information (e.g., the PhoneScore). Likewise, if additional information is included in the input data, the scoring technique may determine additional scores.

Example Clustering Evaluation Processes

Figure 3:
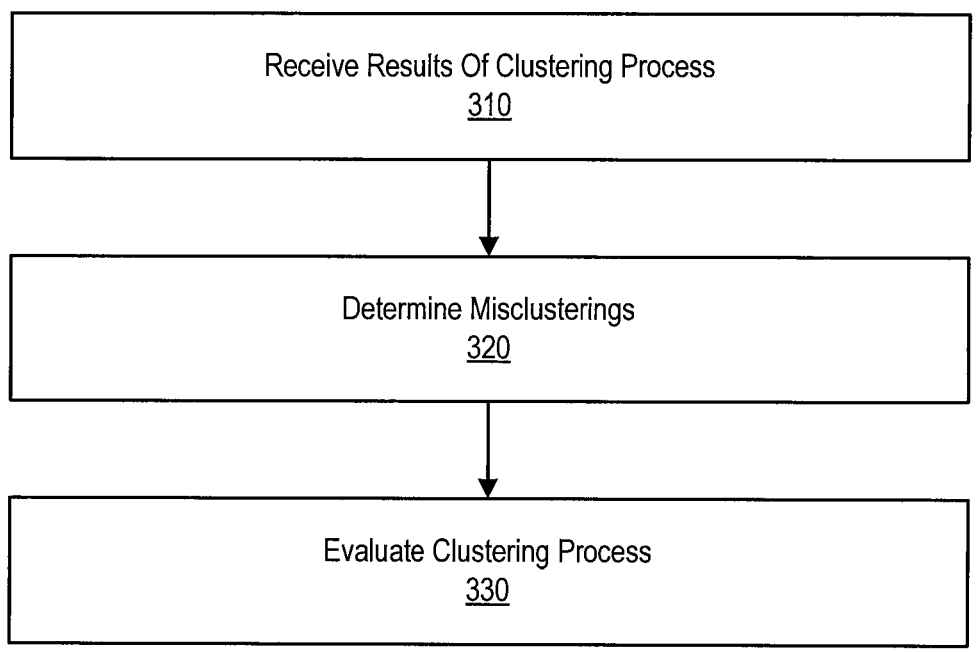
FIG. 3 is a flow diagram depicting an example clustering evaluation process.

FIG. 3 is a flow diagram of an example clustering evaluation process 300, which could be used to evaluate the clustering process 200. In some implementations, the process 300 may be performed by the information retrieval system 120. The process 300 could be performed by other systems, which may be coupled to the system 120, in conjunction with or instead of the system 120. The process 300 may include receiving results of a clustering process (310), determining misclusterings (320), and evaluating the clustering process based on the determined misclusterings (330).

The process 300 may begin by receiving results of a first clustering process (310). This may involve receiving one or more clusters generated by a clustering process employed by the information retrieval system 120. In one example, receiving results of a first clustering process may include receiving some or all of the resultant clusters 220(1)-220(m) generated by the clustering process 200. The process 300 may be configured to receive all of the resultant clusters generated by a clustering process, or it may select less than all of generated resultant clusters.

Receiving results (310) may involve receiving stored results of a previously executed clustering process. Receiving results may also involve receiving results as a clustering process executes. In some examples, clustering results may be stored in one or more repositories, such as databases. Results of clustering could also be received indirectly by retrieving or receiving information from one or more elements that use clustering results. For example, receiving clustering results may involve receiving information (e.g., listings) from a search index built using clustered data.

Receiving results of a clustering process (310) may involve receiving results in response to user commands that, for example, initiate an analysis of the clustering process. For example, a user could input (e.g., through a program interface) one or more commands to a system executing the process 300 (e.g., the system 120) to cause the process 300 to receive results of the clustering process. The user may input, for example, commands that activate the evaluation process 300 and commands that select a particular clustering process as the clustering process to evaluate. The user may also input commands to select input data for the clustering. In addition, the user may input commands for initiating or selecting certain indices or results from storage or for indicating that certain results should be received from a clustering process. The user commands could be input by way of one or more program interfaces provided by the information retrieval system 120 and/or the user access devices 110.

The process 300 may determine misclusterings (320) based on the received results of the clustering process. The term "misclustering" refers to, for example, the generating of resultant clusters that deviate in some way from expected or desired resultant clusters. Misclustering may refer to situations where records in a particular resultant cluster do not relate properly and situations where records that should be merged into a single cluster are split among several clusters.

Figure 4:
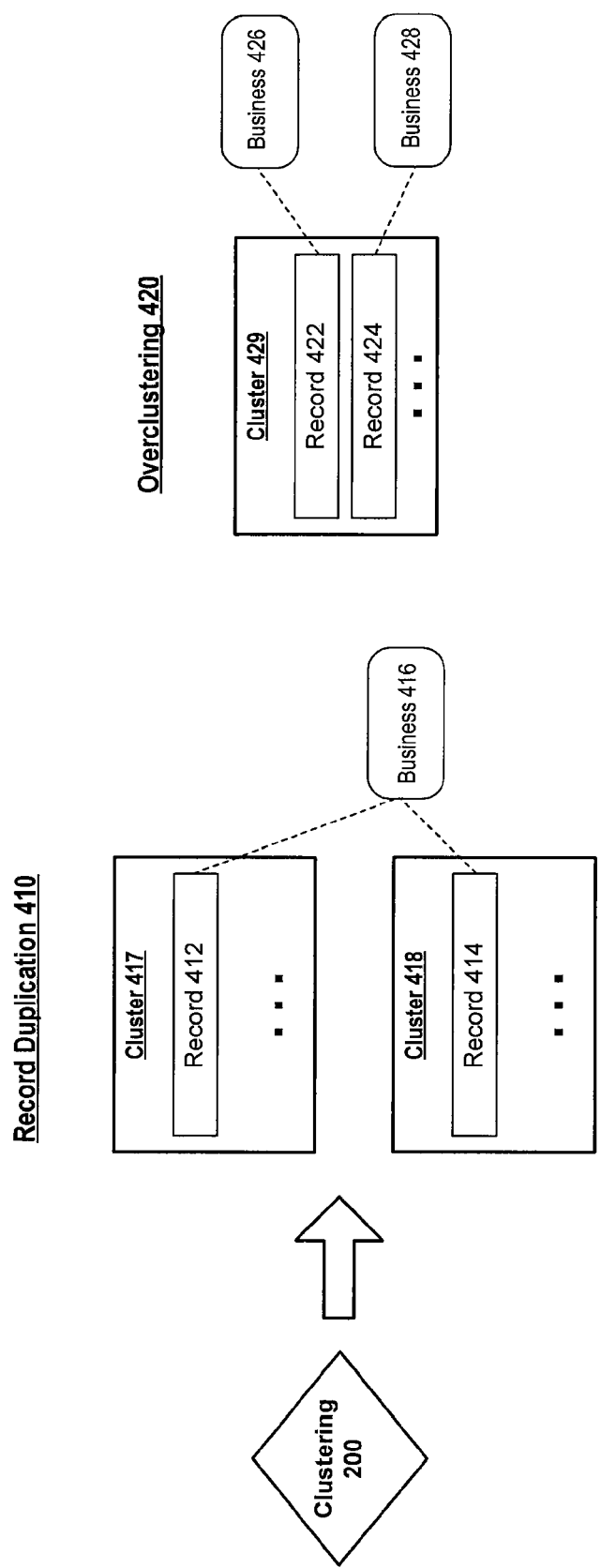
FIG. 4 is a block diagram showing example misclusterings.

FIG. 4 graphically depicts example misclusterings, which could result from the clustering process 200 and be determined by the process 300. The misclusterings could include a record duplication 410 and an overclustering 420. These example misclusterings could be evaluated as part of the process element 320 of process 300.

The record duplication 410 may occur when records associated with a single entity (e.g., a particular business) are grouped in different clusters. For example, record 412 and record 414 may describe the same business 416, but these records (412, 414) may be grouped in different clusters, e.g., the clusters 417 and 418. This type of misclustering may result in duplicate listings in a search index. For example, a single pizza shop might be listed more than once in the index.

The record duplication 410 could occur when different records for a single business include different phone numbers or slight deviations in the business name. The duplication could also occur when different records for a single business include completely different names, even if the phone numbers and addresses are the same. These types of situations may cause the scoring technique used by the clustering process 200 to miscluster the records. That is, these situations may cause one or more of the NameScore, AddressScore and PhoneScore to be sufficiently low such that the TotalScore fails to exceed the threshold.

As an example, consider the following two records, which may be received from different sources:
Record 1:
JOHN'S PIZZA +555-123-4567
1234 LAS VEGAS BLVD, LAS VEGAS, NV 89109, USA
Record 2:
JHON'S PIZZA
1234 LAS VEGAS BLVD, LAS VEGAS, NV 89109, USA
In this example, Record 1 includes a telephone number but Record 2 does not. This may result in a low or zero PhoneScore. In addition, Record 2 includes a misspelling in the business name, i.e., "Jhon's" instead of "John's." This misspelling may lower the NameScore, especially since the name includes common words. For example, the NameScore could be 18.68 with a distance penalty of 3.88. In this situation, the TotalScore would be 14.80 (18.68–3.88). Assuming the threshold were set at 15.0, the Record 1 and Record 2 would not merge in the same cluster, even though they describe the same entity. As a result, the search index would include two listings for the same entity: one for John's Pizza and another for Jhon's Pizza.

As another example of duplication, consider the following two records:
Record 1:
BOB'S LEARNING CENTER +555-123-4567
1234 LAS VEGAS BLVD, LAS VEGAS, NV 89109, USA
Record 2:
BOB'S LEARNING CENTERS
1234 LAS VEGAS BLVD, LAS VEGAS, NV 89109, USA
Here again, the records may not merge even though they describe the same entity. In this case, the Record 2 lacks a telephone number and lists the business name as "Bob's Learning Centers," which is slightly different than the name in Record 1. This could result in a NameScore of, for example, 28.80, with a distance penalty of 4.47. Because Record 2 lacks a telephone number, the PhoneScore could be zero. The TotalScore in this example would therefore be 24.30 (28.80–4.47). Assuming a threshold of 15.0, the TotalScore of 24.30 would exceed the threshold. Even though the threshold is exceeded, the records may not merge because of a rule that specifies that certain "weak" clusters (e.g., no phone number and non-identical names) should not be merged.

Another type of misclustering includes the overclustering 420. The overclustering 420 may occur when records associated with different entities are grouped in a single cluster. For example, record 422 and record 424 may describe different entities, such entity 426 and entity 428, but may be merged by the clustering process 200 into a single cluster, such as the cluster 429. This may result in one or more listings being omitted from a search index. For example, the index could include a listing for a single business where there are actually multiple separate listings that should be listed individually. The overclustering 420 may occur when many business entities share a similar address or telephone number. Records associated with businesses in, for example, large hotels, shopping malls, hospitals, universities, business complexes, airports, and the like may be especially prone to overclustering.

As an example of overclustering, consider the following two records, which could be received from different sources:
Record 1:
ACME BUILDING COMPANY +555-123-4567
1234 RENO AVE, LAS VEGAS, NV 89119, USA
Record 2:
CAR RENTAL COMPANY INC +555-765-4321
1234 RENO AVE #5, LAS VEGAS, NV 89119, USA
In this example, the names and telephone numbers in the two records are different. The PhoneScore could be, for example, zero. The NameScore could be, for example, 8.37 with a distance penalty of 3.34. The TotalScore in this case would be 5.03 (8.37–3.34). Assuming a threshold of 15.0, the TotalScore would not exceed the threshold value. Even so, the clustering process 200 may merge Record 1 and Record 2 since the term score (i.e., the score on name without the term penalty) is above another term threshold value (e.g., 5.0). This example shows that even records with low name scores may be merged by the clustering process 200.

As another example of overclustering, consider ten different records describing ten different business entities that are located in a single location (e.g., a business complex or hotel). In this example, all ten records could include the same telephone number and address (e.g., the number and address of the complex or hotel). This could result in all ten records being merged into a single cluster. As a result, the search index might include a single listing, when there are actually ten different business entities that should be listed individually.

Referring again to FIG. 3, the process 300 may determine misclusterings (320) by determining or identifying record duplication (e.g., 410) and/or overclustering (e.g., 420) based on the results received from the clustering process. In some implementations, determining misclusterings (320) may involve determining a tendency of the clustering process to duplicate records and/or a tendency of the clustering process to overcluster. The determining (320) may involve quantifying these tendencies using one or more metrics, which could be expressed as percentages. Determining misclusterings (320) may involve generating and/or outputting information reflecting results of the comparison for subsequent processing. For example, the process 300 may involve outputting quantified tendencies for evaluation or other use by a user or system.

The process 300 may evaluate the clustering process based on the determined misclusterings (330). This may involve processing and or routing information associated with the clustering process to a user or system, enabling quality control and evaluation of the clustering process. As an example, the process 300 may process and route determined duplication and overclustering tendencies of the clustering process for analysis by a user of the information retrieval system 120 or the user access devices 110.

In some implementations, evaluating the clustering process (330) may involve determining a desired balance between overclustering and duplication tendencies. For example, the process 300 may determine that the desired balance should include less than 30% overclustering and less than 15% duplication. Other balances may also be determined. The process 300 may allow a user or system to modify the clustering process to achieve the desired balance between tendencies. For example, the process 300 may allow the user or system to input various changes to the clustering process or the input data to attempt to identify a clustering process that achieves the desired balance or trade-off between overclustering and duplication. The process 300 may determine misclusterings (320) for each modification of the clustering process and allow the user or system to view and analyze the results. Additional details of example modifications of a clustering process are discussed below in connection with FIG. 8.

In some examples, evaluating the clustering process (330) may involve tracking overclustering and/or duplication tendencies over various time periods. As an example, a given clustering process may be applied to input data once every three days. The process 300 may determine duplication and overclustering tendencies for each application of the clustering process. The determined tendencies may be compiled and routed for analysis by a user or system at various times. For example, the determined tendencies may be routed for analysis every two weeks, allowing the user or system to view and analyze the progression of tendencies during a two-week window of time. Changes in the tendencies over time may then trigger certain actions related to the clustering process. For example, the clustering process could be modified based on perceived changes in the tendencies.

Figure 5:
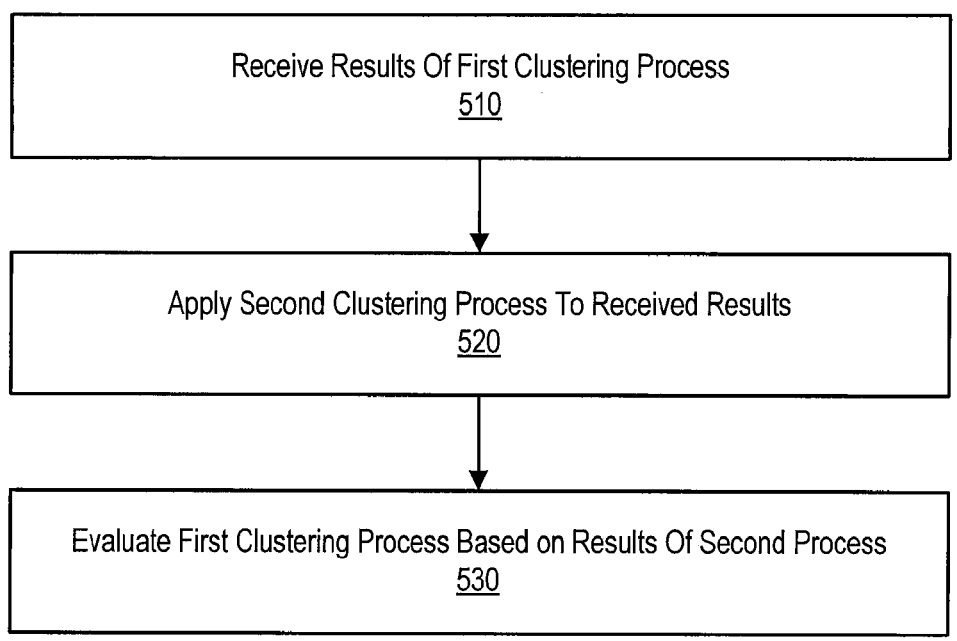
FIG. 5 is a flow diagram depicting an example process for determining misclusterings.

FIG. 5 is a flow diagram depicting an example process 500 of determining misclusterings. The process 500 may be part of the determining misclusterings element 320 of process 300. As with the process 300, the process 500 may be performed by the information retrieval system 120. The process 500 could be performed by other systems, which may be coupled to the information retrieval system 120, in conjunction with or instead of the system 120. The process 500 may include receiving results of a first clustering process (510), applying a second clustering process to the received results (520), and evaluating the first clustering process based on results of the second clustering process (530).

The process 500 may begin by receiving results of a first clustering process (510). This may involve receiving resultant clusters in a manner similar to that described above in connection with process element 310 of FIG. 3.

The process 500 may apply a second clustering process to the received results of the first clustering process (520). This may involve applying a "referee" process to one or more resultant clusters generated by the first clustering process. The term "referee" process refers to, for example, any second clustering process that differs in some respect from the first clustering process such that the referee process can generate different results in at least one case.

In some implementations, the referee clustering process may use a different mode of operation than the first process. For example, the first clustering process could be a K-means, agglomerative clustering process while the referee clustering process could be a fuzzy c-means clustering process. In some implementations, the referee clustering process may be the same as the first clustering process but may be configured with different thresholds and/or different threshold values. For example, the first clustering process may employ a scoring technique with a TotalScore threshold of 15.0 while the second clustering process may employ the same scoring technique with a TotalScore threshold of 10 or 30. In some examples, the referee clustering process may include scoring techniques that differ from those used in the first clustering process. For instance, the referee process could employ normalized scores while the first process does not, or vice versa.

The process 500 may then evaluate the clustering process based on results of the second clustering process (530). This may involve evaluating the first clustering process to determine or identify misclusterings, such as duplication and overclustering.

In some examples, the process 500 may determine or identify misclusterings by comparing results of the referee clustering process with the original results of the first clustering process. The process 500 may use results of the comparison to identify trends and tendencies associated with the first clustering process. In some examples, the process 500 may quantify these trends and tendencies using various metrics. Evaluating the first clustering process (530) may involve generating and/or outputting information reflecting results of the comparison for subsequent processing. For example, the evaluating (530) may involve outputting quantified tendencies for evaluation or other use by a user or system.

Figure 6:
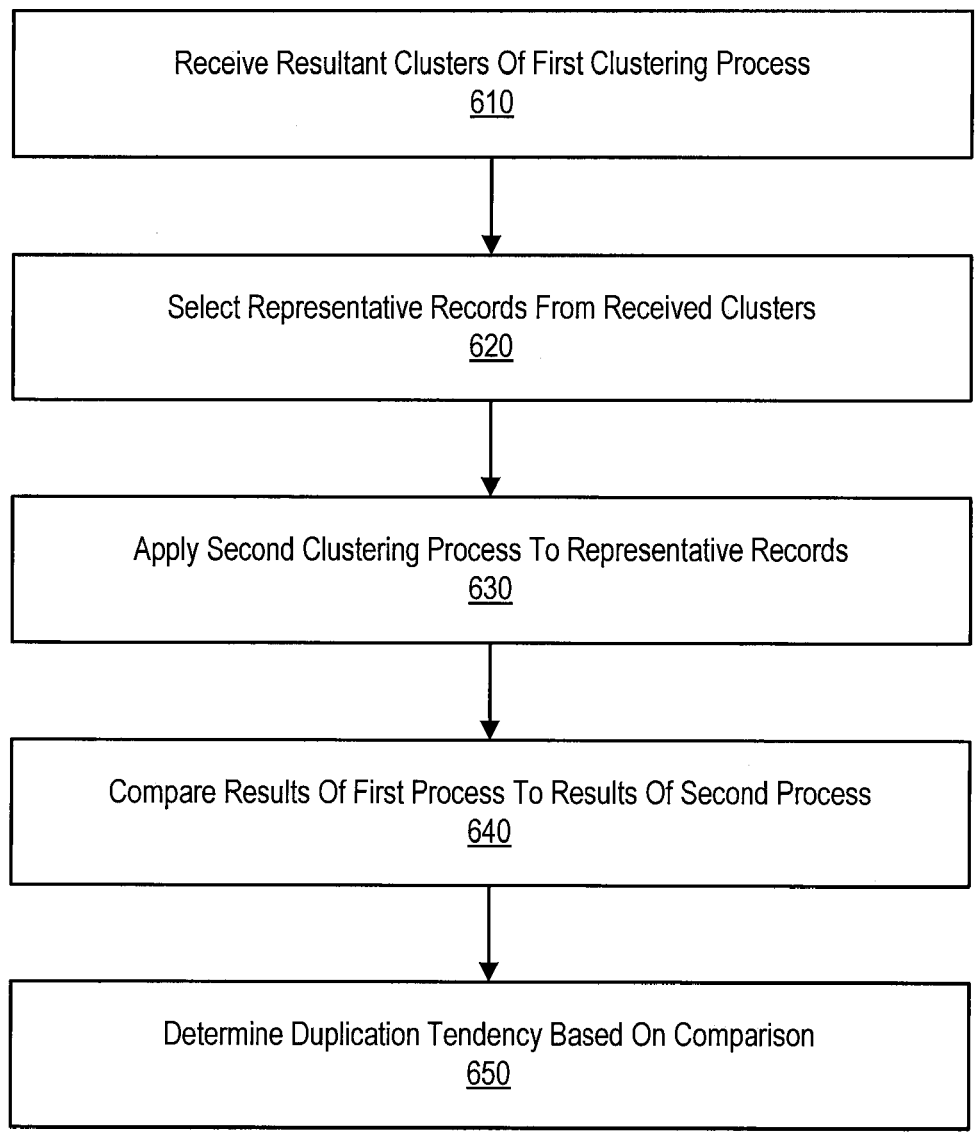
FIG. 6. is a flow diagram depicting an example process for evaluating duplication in clustering.

FIG. 6 is a flow diagram depicting an example process 600 of evaluating record duplication, such as the duplication 410. In some examples, the process 600 may be part of the applying (520) and evaluating (530) process elements described above in connection with the process 500. The process 600 may be performed by the information retrieval system 120. The process 600 could be performed by other systems, which may be coupled to the system 120, in conjunction with or instead of the information retrieval system 120.

The process 600 may begin when resultant clusters of a first clustering process are received (610). This may involve receiving resultant clusters in a manner similar to that described above in connection with process element 310 of FIG. 3. The process 600 may the select representative clusters from the received clusters (620). The term "representative" cluster refers, for example, to a record in a particular cluster that most strongly (with respect to the other records in the cluster) represents or characterizes that cluster.

Selecting representative clusters (620) may involve determining for each record in each cluster how strongly the record represents its cluster. The selecting (620) may also involve comparing the determined representation strengths and selecting a record from each cluster with the strongest representation. In some examples, selecting representative clusters (620) may involve selecting from each cluster the record having the highest authority value in the cluster. As described above, the authority values may be assigned to the records during the clustering process.

The process 600 may apply a second clustering process to the representative records (630). This may involve applying a referee process to the representative records. As an example, assume the process 600 receives one hundred clusters generated by the first clustering process, each cluster containing one or more records. In this example, the process 600 would select one hundred representative records, one representative record for each of the received clusters. Applying a second clustering process (630) may involve subjecting the one hundred representative records to re-clustering by the referee clustering process. That is, the representative records may be used as an input set to the referee clustering process.

The process 600 may then compare the received resultant clusters of the first clustering process with results of the applied second clustering process (640). This may involve comparing the number of received resultant clusters of the first process (e.g., 100) with the number of clusters generated by applying the second clustering process to the selected representative clusters.

The process 600 may determine a duplication tendency (650) of the first clustering process based on the comparison (640). The duplication tendency may represent a tendency of the clustering to produce duplicated listings. This duplication tendency may be a relative tendency of the first process with respect to the referee process, since the output of the referee clustering process may or may not be correct with respect to an ideal clustering output and since the output may vary depending on the particular referee process used.

If none of the representative records merge when the referee process is applied, then the number of clusters will be the same with both clustering processes. In this case, the process 600 may determine that the first clustering process does not have a tendency to duplicate records with respect to the referee process. If however some of the selected representative records merge when the referee process is applied, then the number of clusters generated by the referee process will be less than the number of clusters received from the first process. In this case, the process 600 may determine that the first clustering process has some tendency to duplicate records with respect to the referee process.

In some examples, determining the duplication tendency (650) may involve determining a duplication metric, which may be referred to as a "D-indicator." The duplication metric may indicate the degree to which the first clustering process tends to produce record duplication. Determining the duplication metric may involve quantifying the determined relative duplication tendency and expressing the quantified tendency as a percentage. As an example, assume the process 600 receives one hundred clusters from the first clustering process and some the selected representative records from these clusters merge so that the referee process produces ninety clusters. In this case, determining the duplication tendency (650) may involve quantifying the duplication tendency with a D-indicator equal to 10/100 or 10 percent.

Figure 7:
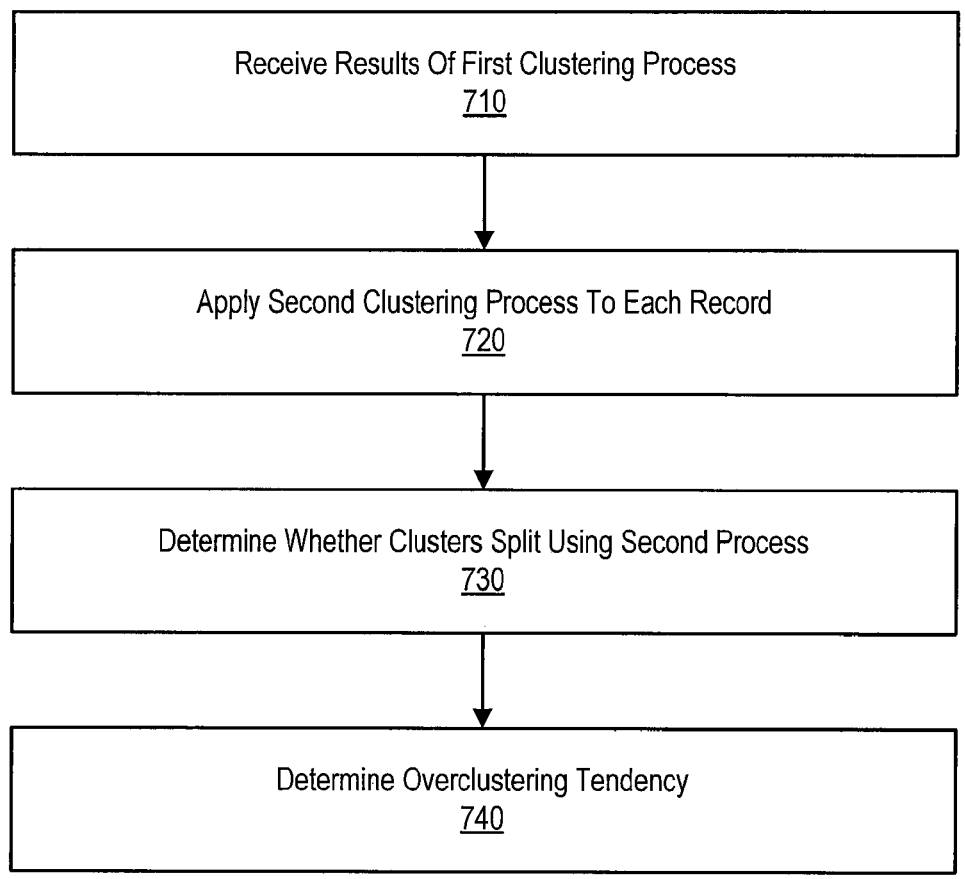
FIG. 7 is a flow diagram depicting an example process for evaluating overclustering.

FIG. 7 is a flow diagram depicting an example process 700 of evaluating overclustering, such as the overclustering 420. In some examples, the process 700 may be part of the applying (520) and evaluating (530) process elements described above in connection with the process 500. The process 700 may be performed by the information retrieval system 120. The process 700 could be performed by other systems, which may be coupled to the system 120, in conjunction with or instead of the system 120.

The process 700 may begin when resultant clusters of a first clustering process are received (710). This may involve receiving resultant clusters in a manner similar to that described above in connection with the process element 310 of FIG. 3. The process 700 may then apply a second clustering process to the received resultant clusters (720). This may involve applying a referee clustering process to each of the received resultant clusters of the first clustering process. For example, assume the process 700 receives one hundred resultant clusters generated by the first clustering process. In this example, applying a second clustering process (720) may involve applying a referee clustering process to each of those one hundred clusters such that the records in the clusters are successively clustered by the second clustering process.

The process 700 may determine whether clusters split when the second clustering process is applied (730). As an example, assume the process 700 applies the second clustering process to the records contained in a received cluster A. The determining (730) may involve analyzing the results of the second clustering to determine whether the records in cluster A split when the referee process is applied. That is, the process 700 may determine whether the records in the single cluster A of the first clustering process generate multiple clusters during re-clustering with the referee process. The determining (730) may involve analyzing the results of the second clustering to determine, for example, whether or nor clusters split, which clusters split, and/or which records cause the splits.

The process 700 may determine an overclustering tendency (740) of the first clustering process. The overclustering tendency may represent a tendency of the clustering to overcluster. As with the duplication tendency, this tendency may be a relative tendency of the first process with respect to the referee process, since the output of the referee clustering process may or may not be correct with respect to an ideal clustering output and since the output may vary depending on the particular referee process used.

If none of the clusters of the first clustering process split when the referee process is applied, then the process 700 may determine that the first clustering process does not have a tendency to overcluster records with respect to the referee process. If however one or more of the clusters split when the referee process is applied, then the process 700 may determine that the first clustering process has some tendency to overcluster records with respect to the referee process.

In some examples, determining the overclustering tendency (740) may involve determining an overclustering metric, which may be referred to as an "O-indicator." The overclustering metric may indicate the degree to which the first clustering process tends to produce overclustering. Determining the overclustering metric may involve quantifying the determined relative overclustering tendency and expressing the quantified tendency as a percentage. This percentage may represent a percentage of splits while reclustering records in the same cluster using the second clustering process. As an example, assume the records in a received cluster A split into multiple clusters when the second clustering process is applied. In this case, determining the overclustering tendency (740) may involve quantifying the overclustering tendency with an O-indicator equal to the percentage of the splits.

Consistent with some implementations, the determined overclustering and duplication tendencies (e.g., O-indicators and D-indicators) of a given clustering process may be used to facilitate quality control and evaluation of that clustering process. The evaluated tendencies may trigger certain actions related to a clustering process. For example, as discussed above in connection with FIG. 3, a user or system may modify the clustering process and/or the input data based on the determined tendencies. The determined tendencies may also be tracked over various time periods to allow users and systems to view and analyze tendency changes and trends (which may result from modifications to clustering processes or input data) during various windows of time.

Figure 8:
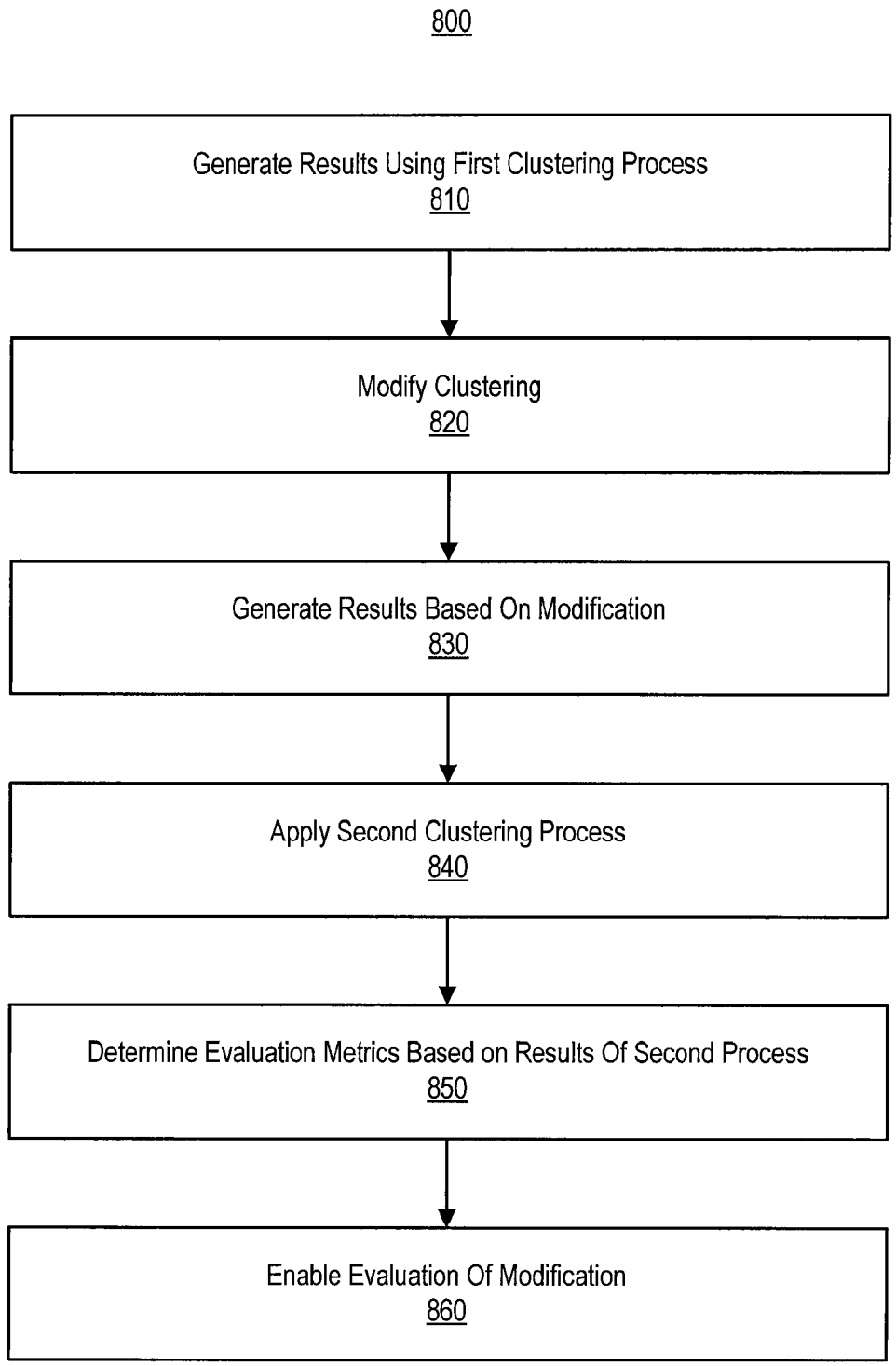
FIG. 8 is a flow diagram depicting an example process for evaluating a clustering modification.

FIG. 8 is a flow diagram of an example process 800 of evaluating a clustering modification. In some examples, the process 800 may be part of other process elements described above in connection with the process 300, 500, 600 and/or 700. The process 800 may be performed by the information retrieval system 120. The process 800 could be performed by other systems, which may be coupled to the system 120, in conjunction with or instead of the system 120.

The process 800 may begin when results are generated using a first clustering process (810). This may involve applying a first clustering process used by the information retrieval system 120 to input data, which could be stored on or accessible by the information retrieval system 120. In one example, generating results of a first clustering process may include generating the resultant clusters 220(1)-220(m) generated by the clustering process 200.

In some examples, generating results (810) may involve receiving stored results of a previously executed clustering process or receiving results as a clustering process executes. Generating results (810) may also involve generating and/or receiving information (e.g., listings) in a search index, such as a local search index used by the information retrieval system 120.

In some examples, the process 800 may generate results (810) in response to one or more user commands. For example, a user may initiate (e.g., through commands to a program interface) the evaluation process 800 and the first clustering process. The user may, for example, input commands that select and activate the process 800 and that select and activate the first clustering process. The user may also input commands to select input data for the clustering. In addition, the user may input commands for initiating or selecting certain results from storage or for indicating that certain results should be generated or received from a clustering process.

The process 800 may then modify clustering (820). This may involve modifying the first clustering process. Modifying the first clustering process may include replacing the first clustering process with an entirely different clustering process. Modifying the first clustering may also involve changing or modifying one or more aspects of the first clustering process In some implementations, the modifying (820) may involve changing an aspect of the underlying mode of operation of the first clustering algorithm. For example, modifying the first clustering process could include modifying the mode of operation from a K-means, agglomerative clustering process to a fuzzy c-means clustering process.

In some implementations, the modifying (820) may include modifying a threshold value associated with the first clustering process, such as the TotalScore threshold. It could also involve changing or modifying the manner in which various scores (e.g., TotalScore, NameScore, PhoneScore, AddressScore, etc.) are computed. Modifying the first clustering process (820) could also involve modifying an aspect of one or more rules used by the clustering, such as the rules discussed above in connection with FIG. 2.

In some examples, one or more scores used by the clustering could be modified by normalizing the scores. For example, the NameScore could be normalized as follows:

$$NameScore(S1,S2) = scale\_const \times [term\_score(S1,S2) / term\_score(S1,S1)]$$

In the above, term_score(S1, S1) is the maximum score for any name that could match S1 and the name_score(S1, S2)∈[0 . . . scale_const].

To illustrate the normalized name score, assume the scale_const=30. In this example, a NameScore of 15 would mean a "half" match, a NameScore of 20 would mean a "⅔ match" and a NameScore of 30 would mean an "exact match." Using some fixed threshold (e.g., 15.0), the scale_const may depend on the completeness of the location data. That is, if a phone number is missing from a data record, the scale_const could be set to a first value (e.g., 45.0). If the phone number is included in the record, the scale_const could be set to some other value (e.g., 30.0). In this fashion, the NameScore may have an increased negative effect on the overall score with respect to the overall threshold (e.g., 15.0) when the phone number is missing.

In some implementations, modifying clustering (820) may involve changing or modifying the data input to the clustering process or the manner in which data is input to the clustering process. Modifying the input data could include changing the original input data to different input data, changing a format of the input data, and/or changing the universe of available input data (e.g., by changing the available sources of input data). Data modifications could be performed instead of or in conjunction with modifications of the first clustering process.

The process 800 may modify clustering (820) based on one or more user commands. For example, the process 800 may allow a user to input commands that effect changes to or replacement of the first clustering process and/or changes to the input data. These commands could be input by way of one or more program interfaces provided by the information retrieval system 120 and/or the user access devices 110.

The process 800 may generate results based on the modification (830). This may involve applying a modified first clustering process to the same input data that generated the original results in stage 810 or applying the modified first clustering process to modified input data. Generating results based on the modification (830) may also involve applying the first, un-modified clustering process to modified input data. Generating results based on the modification (830) may involve generating modified results, which may include one or more resultant clusters generated by the modified or unmodified first clustering process. The process 800 may generate results based on the modification (830) in response to one or more user commands.

The process 800 may then apply a second clustering process (840). This may involve applying a second clustering process to modified results generated (in the process stage 830) based on the modification. Applying a second clustering process may include applying a "referee" clustering process, as discussed above in connection with FIG. 5. Applying a second clustering process (840) may involve subjecting the modified results generated in stage 830 to re-clustering by the referee clustering process. In some examples, applying the second clustering process (840) may involve applying a second process to representative records selected from clusters in a manner similar that described above in connection with process 600 (element 630). Applying the second clustering process (840) may also involve successively applying a second clustering process to each of resultant clusters, in a manner similar that described above in connection with process 700 (element 720).

The same or different second clustering processes could be used for each application of a second clustering process. For example, the process 800 may apply a referee process X to representative records, in a manner similar to that discussed above in connection with FIG. 6. The process 800 could then apply another referee process Y to each resultant cluster in the results, in a manner consistent with that discussed above in connection with FIG. 7.

The process 800 may apply the second clustering process (840) based on one or more user commands. For example, a user may select, define, and/or initiate the second clustering process. The user may also input commands that select the modified results for clustering by the second clustering process.

The process 800 may determine evaluation metrics based on results of the second clustering process (850). This may involve determining a duplication tendency and/or an overclustering tendency associated with a modified first clustering process, based on the results of the second clustering process. This may also involve determining duplication and/or overclustering tendencies associated with an un-modified first clustering process applied to modified input data, based on the results of the second clustering process. Determining evaluation metrics (850) may involve determining for the modified or un-modified first clustering process a D-indicator and/or an O-indicator, in manners consistent with those discussed above in connection with FIGS. 6 and 7.

Upon determining evaluation metrics, the process 800 may enable an evaluation of the modification of the first clustering process (860). This may involve enabling a user or system to compare and analyze the results of the first clustering process and/or the modified results. As an example, the process 800 may enable one or more users of the information retrieval system 120 and/or the user access devices 110 to perform an evaluation of the clustering. The evaluation could be performed using one or more program interfaces with which users may interact.

In some implementations, enabling an evaluation (860) may involve enabling a user or system to compare and analyze clustering results (e.g., the original clustering results and the modified clustering results) with respect to certain sample data. The sample data may be selected based on the determined evaluation metrics. As an example, the process 800 may use the evaluation metrics to select one or more of the original and/or modified clustering results associated with a selected geographic location or some other selection criteria. The process 800 may also use the metrics to select one or more input data records. The selected results and/or data records may represent certain predetermined or known problematic listings. The process 800 may process and route the selected results to the user or system for analysis.

In some implementations, the process 800 may determine whether an O-indicator is high or low relative to some overclustering threshold $T_O$ (e.g., $T_O=40\%$) and/or whether a D-indicator is high or low relative to some duplication threshold $T_D$ (e.g., $T_D=45\%$). The overclustering and duplication thresholds may be predetermined or preset, and they may have identical or different values. Using the determined metric values and the thresholds, the process 800 may select sample data for analysis.

If the O-indicator is high (e.g., 60%) and the D-indicator is low (e.g., 10%), then the process 800 may select certain sample data related to areas in which listings may have a tendency to be overclustered. For example, the process 800 could select sample listings from certain densely populated areas, such as listings from large urban cities such as New York or Las Vegas. The selected data may then be processed and routed for analysis.

If the D-indicator is high (e.g., 60%) and the O-indicator is low (e.g., 10%), then the process 800 may select certain sample data related to areas in which listings may have a tendency to be duplicated. For example, the process 800 could select sample listings from certain sparsely populated regions, such as listings from a small rural town. A predetermined population or other threshold may be used to distinguish rural and urban areas. The selected data may then be processed and routed for analysis.

Other combinations of D-indicator and O-indicator values may be used to select certain sample data for analysis. For example, if the indicators are both low or high, the process 800 may select certain sample data for analysis, such as data associated with densely populated and sparsely populated regions.

In some implementations, particular combinations of evaluation metric values may trigger certain preset test cases or data to be analyzed. For example, a certain D-indicator value and O-indicator value may trigger certain preset sample listings in a preset densely populated city such as Las Vegas to be selected for evaluation. Other indicator values could trigger certain preset sample listings in a more rural town such as Schenectady, N.Y. to be selected for evaluation.

Enabling an evaluation (860) may also involve receiving scores for the modification based on the selected sample data. In some implementations, the process 800 may receive scores from one or more users or systems evaluating the clustering (e.g., users of the information retrieval system 120 and/or the user access devices 110). The scores may be received from users by way of one or more program interfaces and/or or other forms of electronic communication. The process 800 may aggregate received scores to determine whether or not to implement the modification of the first clustering process. For example, scores may be positive or negative and the process 800 may aggregate the scores to determine an overall positive or negative aggregate score. If the aggregate score is negative, then the process 800 may indicate that the modification of the first clustering process received a negative aggregate score and therefore should not be implemented. If however the aggregate score is positive, the process 800 may indicate that the modification received a positive aggregate score and therefore should be implemented.

In some examples, enabling an evaluation (860) may involve tracking overclustering and/or duplication tendencies over various time periods. For example, the process 800 may determine duplication and overclustering tendencies (D-indicators and O-indicators) for multiple applications of the clustering process, which could occur at random or periodic intervals (e.g., every three days). The determined tendencies may be compiled and routed for analysis by a user or system. For example, the determined tendencies may be routed for analysis every week, allowing the user or system to view and analyze the progression of tendencies during that window of time.

In some implementations, the process 800 could generate various reports, which may include aggregate scores and recommendations on whether or not to implement modifications. The process 800 could also generate reports that include the various metric values, progressions or trends in metric values, selected sample data and/or other appropriate clustering evaluation information.

FIGS. 2-8 are consistent with example implementations. The sequences of events in the illustrated diagrams are exemplary and not intended to be limiting. Other processes may therefore be used and, even with the processes depicted in the figures, the illustrated events and their particular order in time may vary. Further, the illustrated events may overlap and/or may exist in fewer steps. Moreover, certain events may not be present and additional events may be included in the illustrated processes.

Example Advertising Applicability

In certain implementations, aspects of the clustering process 200 and/or the processes 300, 500, 600, 700 and 800 may be used in conjunction with one or more advertising environments. Example advertising environments include AdWords™ and AdSense™ provided by Google, Inc. (Mountain View, Calif.).

In some examples, an index or indices of businesses and/or other entities may be built and evaluated using various clustering and clustering evaluation processes consistent with those discussed above in connection with FIGS. 2-8. The index could be configured as a local search index, which may be used by a local search service provided by the information retrieval system 120 or some other system. Advertisements may be related to or targeted based on the local search index or local search results. For example, a user searching for pizza shops in Los Angeles may be presented with ads for pizza shops or other businesses in that geographic location. The information retrieval system 120 may interact with one or more advertising systems to receive and/or provide the ads to the user access devices 110 (e.g., with local search results).

In some examples, various clustering processes, such as clustering process 200, could be used to determine context information for ads in order to identify content targeted ads for presentation to users. For example, the clustering could group web pages or other information associated with businesses in context-based clusters, such as a food cluster, a restaurant cluster, an automobile cluster, etc. This context information could then be used in conjunction with other information (e.g., location information) to retrieve and target contextually relevant ads to users.

Example Data Processing System Configuration

Figure 9:
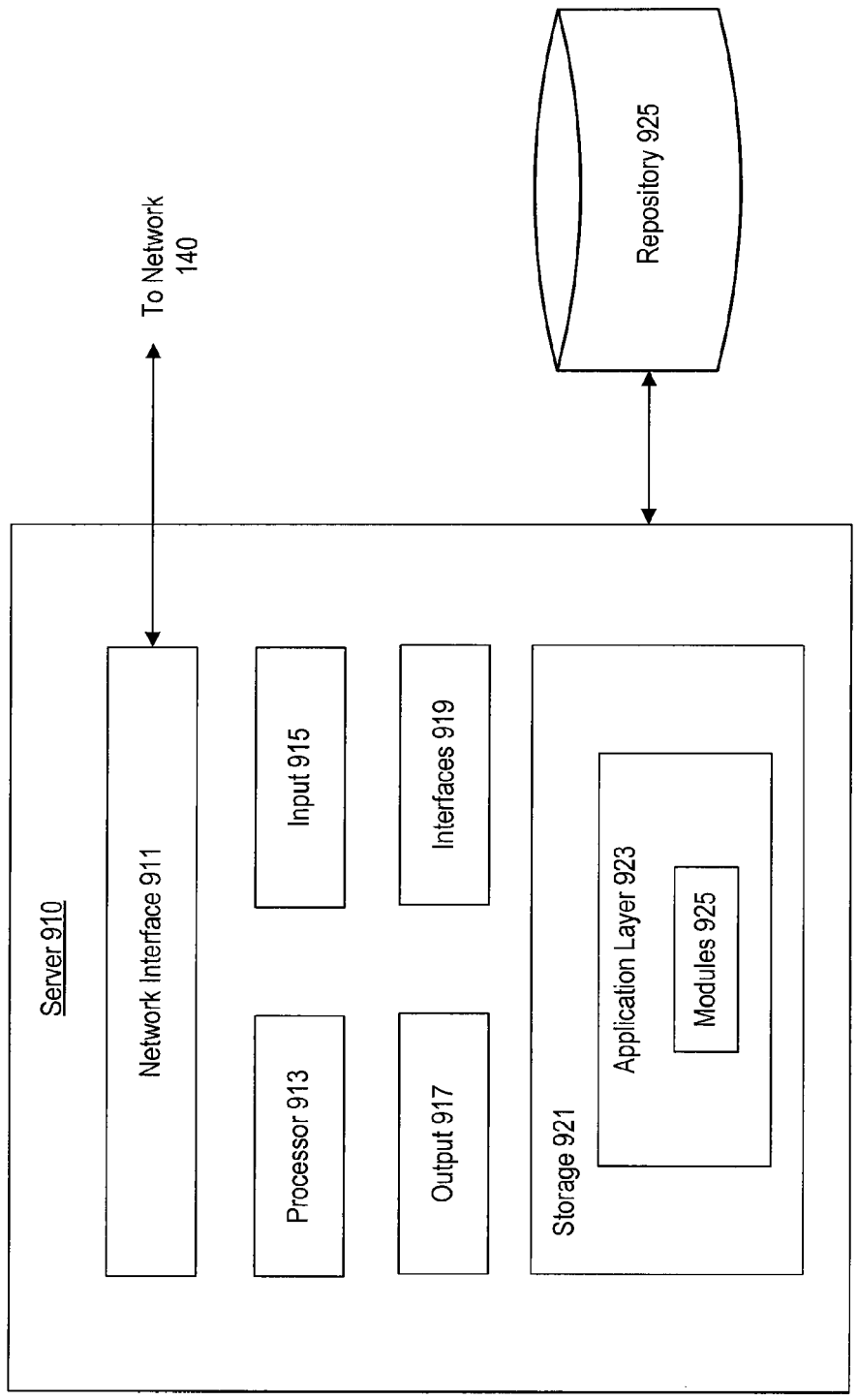
FIG. 9 is a block diagram of an example data processing system configuration.

FIG. 9 illustrates an example configuration 900 of a server system 910. In some implementations, the data processing system 125 depicted in FIG. 1 could be configured in a manner consistent with configuration 900. The configuration 900 is exemplary only, and the system 910 could be configured in other ways. Further, each of multiple servers could have its own individual structure and configuration. Moreover, as noted above, the functions provided by the system 125 could be performed by a single server computer or could be performed by a single server process running on a single computer.

In the configuration 900, the server 910 may include various components, such as a network interface 911, a processor 913, an output 915, an input 917, interfaces 919, and a storage 921. One or more system buses (not illustrated) may interconnect these components. The number, identity and arrangement of elements in the configuration 900 are not limited to what is shown, and additional and/or different elements may be contained in or coupled to the elements shown. Further, configuration 900 may include fewer components than what is illustrated.

The network interface 911 may facilitate connectivity with a network, such as the network 140. Network interface 911 may be any appropriate wireline (e.g., IEEE 1394, USB, etc.) or wireless (e.g., IEEE 802.11™, Bluetooth®, IrDA®, etc.) mechanism for facilitating unidirectional or bidirectional transmission of data between the server 910 and a network. The network interface 911 may include one or more network cards and/or data and communication ports.

The processor 913 routes information among components and executes instructions from storage 917. Although FIG. 9 illustrates a single processor, the server 910 may include any number of general- and/or special-purpose processors. The processor 913 may be implemented, for example, using one or more commercially available INTEL® processors.

The output 915 may present text, images, video, audio, or any other type of information. Examples of the output 915 include, video display devices, audio display devices, printers, and the like. The output 915 may display user interface information for various software applications running on the server 910, as well as the operating system programs necessary to operate the system. The output 915 may present information by way of a cathode ray tube, liquid crystal, liquid crystal on silicon, light-emitting diode, gas plasma, laser, or other type of display mechanism. The output 915 could also be configured to receive, generate and/or present holographic or other visual representations. The output 915 may be configured to audibly present information, and it may include suitable components for receiving and presenting audio signals. Although FIG. 9 illustrates a single output 915, the server 910 may include any number of similar or different output devices.

The input 917 may include components such as a keyboard, a mouse, a pointing device, a joystick, and/or a touch screen. The input 917 may also include audio- or video-capture devices (e.g., video cameras, microphones, etc.) and/or various sensors for sensing emissions (e.g., thermal, motion, sound, etc.). It may also include one or more information reading devices (e.g., scanners, disk drives, etc.) and/or input ports. Although FIG. 9 depicts the input 917 as a single discrete element, the server 910 may include any number of similar or different input devices. For example, the server 910 could include a keyboard and a mouse as well as a video-capture device, a scanner and several disk drives.

A user of the server 910 may input commands to control and operate functionality of the server 910 by way of the output 915 and the input 917. These commands may, for example, be input by way of user manipulation of physical controls, such as a keyboard or mouse. The user may input commands to select and manipulate graphics and text objects presented on the output 915 in order to operate and control the server 910.

The interfaces 919 may include various interfaces for facilitating bidirectional or unidirectional communication between the server 910 and one or more peripheral or other devices. The peripheral devices may include, for example, output devices (e.g., a monitor, a printer, a speaker, etc.), input devices (e.g., a keyboard, a mouse, a scanner, etc.), or any other device operable to connect to the server 910. The interfaces 919 may include a combination of hardware, software and/or firmware components. The interfaces 919 may include various connection ports, such as USB, RS-232, RS-485, Fibre Channel, Ethernet, IEEE 1394, RG-6, and/or TOSLINK.

The storage 921 may provide mass storage and/or cache memory for the server 910. The storage 921 may be implemented using a variety of suitable memory elements. The memory elements may include, for example, solid state elements, optical elements, polymer elements, magnetic elements, and/or organic elements (e.g., crystals). The memory elements may be volatile or non-volatile and may be randomly or sequentially accessed. The storage 921 may include random access memory (RAM), flash RAM, read-only memory (ROM), erasable programmable read-only memory (EPROM), and electrically erasable programmable read-only memory (EEPROM). The storage 921 may include one or more fixed disk drives (e.g., a hard drive, RAID storage, etc.) and one or more removable disk drives (e.g., a CD-ROM drive, DVD drive, etc.). Although a single storage module is shown, the server 910 may include any number of individually configured storage modules.

The storage 921 may store program code for various applications, an operating system (e.g., Windows® XP, Linux® OS), an application-programming interface, application routines, middleware components, and/or other executable instructions. The storage 921 may include program code and information for communications (e.g., TCP/IP communications), middleware components, kernel and device drivers, invariant low-level systems code, data for basic input and output, and various configuration information.

The storage 921 may maintain an application layer 923, which may include various software elements. Such software elements could be transferred to a hard drive (not shown) in the storage 921 by way of network transmissions (e.g., an Internet download) and/or removable disks (also not shown), such as a CD-ROM or DVD.

In some implementations, the application layer 923 may include various application programs or modules 925. The modules 925 may include and/or use one more data structures as well as one or more computational algorithms that may operate on various data. The modules 925 may include sets of instructions for performing various tasks, and the modules may output information for use by users or other systems. In some implementations, the modules 925 may include one or more engines, which may output code (e.g., source code, HTML, etc.) that serves as input to other systems, engines or processes.

The modules 925 may be implemented using any programming or other language suitable for controlling behavior of a system, such as a computer. In some examples, the modules 925 may be implemented using one or more of C/C++, Java, Visual Basic, eXtendible Markup Language (XML), HTML and other languages.

Depending on the particular system configuration, the application modules 925 may include various functionality. For example, the application modules 925 may include one or more modules that store and/or execute operations consistent with the processes depicted in FIGS. 2-8. The various modules in the application layer 923 may interact with each other and with other modules in different systems.

Although depicted within software application layer 923, the modules 925 could include and/or be coupled to various hardware elements (within or external to the server 910). For example, the modules could include one or more neural networks, which may employ software and hardware processing elements or agents linked together. In some examples, the modules could include or use one more embedded systems, such as microcontrollers, routers, etc.

In the configuration 900, the server 910 may be coupled to one or more repositories 925. The repository 127 may be implemented in a manner consistent with the repositories 925. The repository 925 may include any structured collection or aggregation of information that is stored and accessible. In some implementations, the repositories 925 may include one or more structured data archives distributed among one or more network-based data processing systems. The repositories 925 may include one or more schemas for organizing stored information. In some examples, the repositories 925 may include one or more relational databases and systems, distributed databases, object-oriented databases, and/or any other types of databases. Examples of databases include Oracle® databases, IBM DB2 systems, MySQL® databases, XML databases, and the like. Although illustrated as coupled to the server 910, the repositories 925 could be distributed and/or included in various systems and/or networks.

Example User Access Device Configuration

Figure 10:
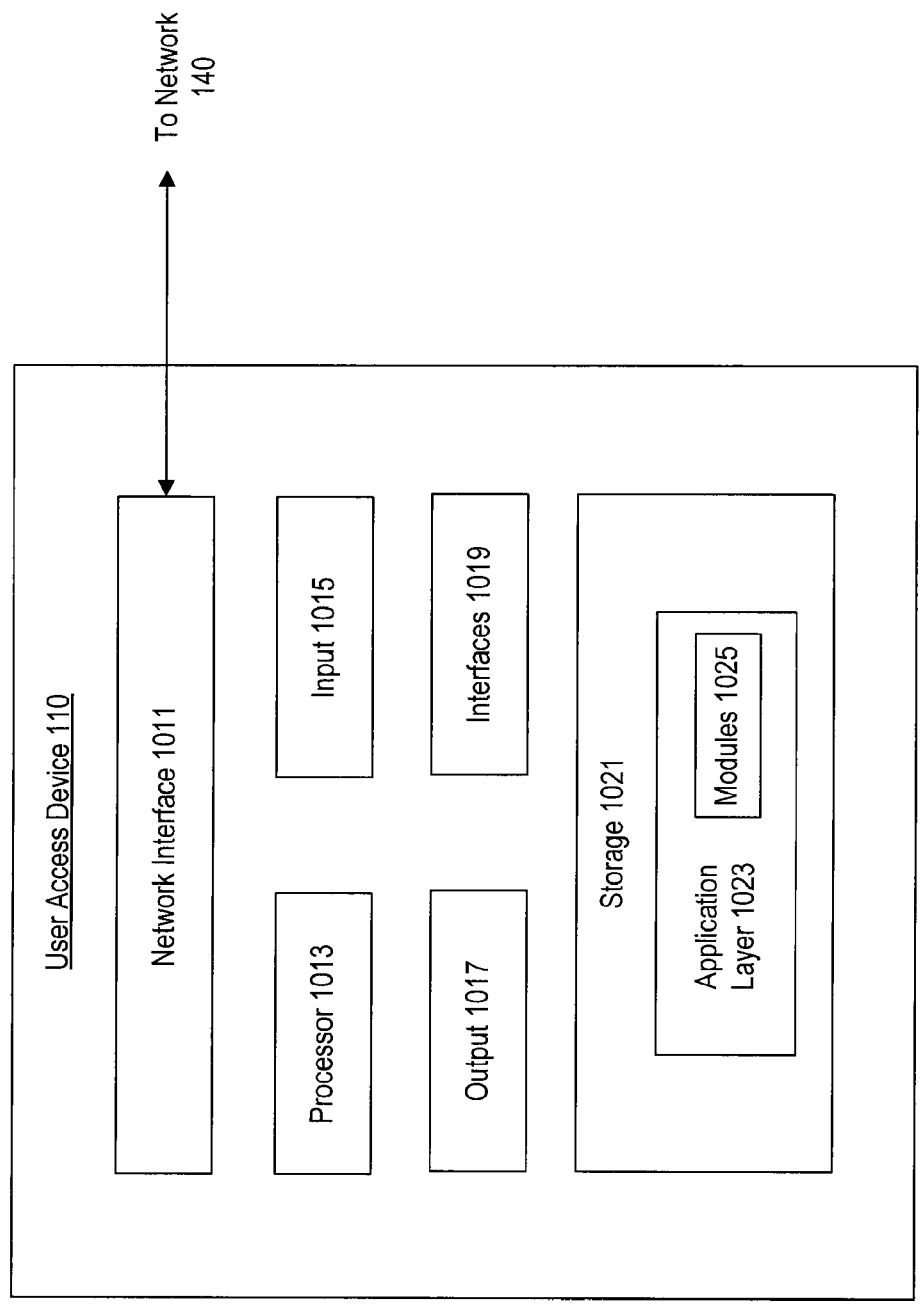
FIG. 10 is a block diagram of an example user access device configuration.

FIG. 10 is a block diagram of an example configuration 1000 of the user access devices 110 in environments 100. The configuration 1000 is an example only. The number, identity and arrangement of elements in the configuration 1000 are not limited to what is shown, and additional and/or different elements may be contained in or coupled to the elements shown.

In the example configuration 1000, the user access devices 110 may include various components, such as a network interface 1011, a processor 1013, an output 1015, an input 1017, interfaces 1019, and a storage 1021, which may maintain an application layer 1023. The components illustrated in FIG. 10 (i.e., 1011, 1013, 1015, 1017, 1019, 1021, and 1023) may be similar in structure and functionality to those components described in connection with FIG. 9 (i.e., 911, 913, 915, 917, 919, 921, and 923). In some implementations, however, one or more of the user access devices 110 may include components that are structurally and functionally different from those described in connection with FIG. 9. For example, the user access devices 110 may be configured with different (e.g., less) storage capacity and different application layers than the server system. In some examples, the application layer 1023 in a user access device may include one or more modules configured to present various viewers (e.g., browsers) to users. The application layer 1023 may also include one or more modules (e.g., modules 1025) for interacting with other elements (e.g., data processing system 125) and/or receiving and processing data, such as search results.

The user access devices 110 could also be configured with less or different processing capabilities than that of the server system. Also, in some examples, the user access devices 110 may include various user interface components (e.g., keypads, display devices, speakers, microphones, etc.) while the server system may lack such (or even any) user interface components. In some implementations, the server system 1010 could be a general purpose server while the user access devices 110 could include embedded systems optimized with specific components for performing specific tasks.

The foregoing description does not represent an exhaustive list of all possible implementations consistent with this disclosure or of all possible variations of the implementations described. Other implementations are within the scope of the following claims.

What is claimed is:

1. A method executed by a computer, comprising:
    receiving first clusters generated by a first clustering process, each first cluster including one or more records;
    applying a second clustering process to the received clusters to generate second clusters, where the second clustering process differs from the first clustering process;
    comparing the first clusters generated by the first clustering process to the second clusters generated by the second clustering process, the comparing including:
        determining a duplication metric, the duplication metric measuring mergers of records that belong to separate first clusters into a second cluster; and
        determining an overclustering metric, the overclustering metric measuring splits of a first cluster into two or more of the second clusters; and
    displaying results of the comparison for evaluating and modifying the first clustering process.

2. The method of claim 1, wherein the second clustering process differs from the first clustering process in that the second clustering process uses a second threshold that is distinct from a first threshold used in the first clustering process.

3. The method of claim 1, wherein:
    receiving the first clusters comprises receiving a first number of first clusters;
    applying the second clustering process to the received clusters comprises:
        selecting a representative record from each of the first clusters generated by the first clustering process; and
        applying the second clustering process to the selected representative records to generate a second number of second clusters; and
    determining the duplication metric comprises:
        determining a difference value that measures a difference between the first number and the second number; and
        determining the duplication metric based on the difference value.

4. The method of claim 3, wherein the duplication metric quantifies the merger of records that each belongs to separate first clusters into one or more of the second clusters.

5. The method of claim 3, wherein the selecting comprises selecting the representative records based on confidence factors.

6. The method of claim 1, wherein the duplication metric reflects a tendency of the first clustering process to duplicate a record associated with a single entity in multiple clusters.

7. The method of claim 1, wherein the duplication metric is expressed as a percentage.

8. The method of claim 1, wherein the overclustering metric quantifies a splitting of records that each belongs to a same first cluster into two or more of the second clusters.

9. The method of claim 1, wherein:
    applying the second clustering process to the received clusters comprises applying the second clustering process to a first number of records, each of the first number of records belonging to a first cluster generated by the first clustering process; and
    determining the overclustering metric comprises:
        determining a second number of first records that split into multiple clusters generated from the first records by the second clustering process;
        determining a difference value that measures a difference between the first number and the second number; and
        determining the overclustering metric based on the difference value.

10. The method of claim 1, wherein the overclustering metric reflects a tendency of the first clustering process to cluster records associated with different entities in a single cluster.

11. The method of claim 1, wherein determining the overclustering metric is expressed as a percentage.

12. The method of claim 1, wherein receiving the first clusters comprises receiving a number of collections of related business records from different sources.

13. The method of claim 1, further comprising:
    building a local search index using the first clusters generated by the first clustering process.

14. The method of claim 1, wherein the displaying comprises outputting information for evaluating at least one aspect of performance associated with the first clustering process.

15. The method of claim 1, further comprising evaluating the first clustering process automatically.

16. The method of claim 1, further comprising evaluating the first clustering process, where the evaluating includes:
    selecting sample data based on the comparison;
    providing the selected sample data to a user; and
    receiving evaluation data from the user based on the sample data.

17. A method executed by a computer, comprising:
    receiving first clusters generated by a first clustering process, each cluster including one or more records;
    applying a second clustering process to the received clusters to generate second clusters, where the second clustering process differs from the first clustering process;
    comparing the first clusters generated by the first clustering process to the second clusters generated by the second clustering process, the comparing including:
        determining duplication metric, the duplication metric measuring mergers of records that belong to separate first clusters into a second cluster, including:
            calculating a first difference value that measures a difference between a first number of the first clusters and a second number of the second clusters; and
            determining the duplication metric based on the first difference value;
        determining an overclustering metric, the overclustering metric measuring splits of a first cluster into two or more of the second clusters, including:

determining a third number of first records that split into multiple clusters generated from the first records by the second clustering process;
determining a second difference value that measures a difference between the first number and the third number; and
determining the overclustering metric based on the second difference value; and
displaying results of the comparison for evaluating and modifying the first clustering process.

18. A system for evaluating a first clustering process, comprising:
one or more computers configured to perform operations comprising:
receiving first clusters generated by a first clustering process, each cluster including one or more records;
applying a second clustering process to the received clusters to generate second clusters, where the second clustering process differs from the first clustering process;
comparing the first clusters generated by the first clustering process to the second clusters generated by the second clustering process, the comparing including:
determining a duplication metric, the duplication metric measuring mergers of records that belong to separate first clusters into a second cluster, including:
calculating a first difference value that measures a difference between a first number of the first clusters and a second number of the second clusters; and
determining the duplication metric based on the first difference value;
determining an overclustering metric, the overclustering metric measuring splits of a first cluster into two or more of the second clusters, including:
determining a third number of first records that split into multiple clusters generated from the first records by the second clustering process;
determining a second difference value that measures a difference between the first number and the third number; and
determining the overclustering metric based on the second difference value; and
displaying results of the comparison for evaluating and modifying the first clustering process.

19. A system, comprising:
one or more computers configured to perform operations comprising:
receiving first clusters generated by a first clustering process, each first cluster including one or more records;
applying a second clustering process to generate second clusters, where the second clustering process differs from the first clustering process;
comparing the first clusters generated by the first clustering process to the second clusters generated by the second clustering process, the comparing including:
determining a duplication metric, the duplication metric measuring mergers of records that belong to separate first clusters into a second cluster; and
determining an overclustering metric, the overclustering metric measuring splits of a first cluster into two or more of the second clusters; and
displaying results of the comparison for evaluating and modifying the first clustering process.

20. The system of claim 19, wherein the second clustering process differs from the first clustering process in that the second process uses a second threshold that is distinct from a first threshold used in the first clustering process.

21. The system of claim 19, wherein the duplication metric reflects a tendency of the first clustering process to duplicate a record in clusters.

22. The system of claim 21, wherein:
receiving the first clusters comprises receiving a first number of first clusters;
applying the second clustering process to the received clusters comprises:
selecting a representative record from each of the first clusters; and
applying the second clustering process to the selected representative records to generate a second number of second clusters;
determining the duplication metric comprises:
determining a difference value that measures a difference between the first number and the second number; and
determining the duplication metric based on the difference value.

23. The system of claim 22, wherein the overclustering metric reflects a tendency of the modified first clustering process to cluster different records in a single cluster.

24. The system of claim 23, wherein:
applying the second clustering process to the received clusters comprises applying the second clustering process to a first number of records, each of the first number of records belonging to a first cluster generated by the first clustering process; and
determining the overclustering metric comprises:
determining a second number of first records that split into multiple clusters generated from the first records by the second clustering process;
determining a difference value that measures a difference between the first number and the second number; and
determining the overclustering metric based on the difference value.

25. A computer readable medium storing a computer program, the computer program including instructions that, when executed, cause at least one processor to:
receive first clusters generated by a first clustering process, each first cluster including one or more records;
apply a second clustering process to the received clusters to generate second clusters, where the second clustering process differs from the first clustering process;
compare the first clusters generated by the first clustering process to the second clusters generated by the second clustering process, the comparing including
determining a duplication metric, the duplication metric measuring mergers of records that belong to separate first clusters into a second cluster; and
determining an overclustering metric, the overclustering metric measuring splits of a first cluster into two or more of the second clusters; and
display results of the comparison for evaluating the first clustering process.

26. The medium of claim 25, wherein the instructions for comparing comprise instructions for determining a duplication metric that further quantifies the merger of records that each belongs to separate first clusters into one or more of the second clusters.

27. The medium of claim 26, wherein the instructions for comparing comprise instructions for determining an overclustering metric that further quantifies a merger of records that each belongs to separate first clusters into one or more of the second clusters.

* * * * *